United States Patent [19]

Shoji

[11] 4,341,358
[45] Jul. 27, 1982

[54] HUB FOR MAGNETIC TAPE

[75] Inventor: Shigemasa Shoji, Tokyo, Japan

[73] Assignee: TDK Electronics Co., Ltd., Tokyo, Japan

[21] Appl. No.: 190,956

[22] Filed: Sep. 26, 1980

[30] Foreign Application Priority Data

Oct. 5, 1979 [JP] Japan .................. 54-137963[U]

[51] Int. Cl.³ ........................................... B65H 75/28
[52] U.S. Cl. .................................................. 242/74.1
[58] Field of Search ............... 242/74, 74.1, 74.2; 16/110 R, 110.5, 111 R, 114 R

[56] References Cited

U.S. PATENT DOCUMENTS

| | | | |
|---|---|---|---|
| 3,620,469 | 11/1971 | Riedel | 242/74 |
| 3,661,345 | 5/1972 | Ritz | 242/74.1 |
| 3,990,733 | 11/1976 | Shiba | 242/74 |
| 4,181,272 | 1/1980 | Shiba | 242/74.1 |
| 4,213,578 | 7/1980 | Katata | 242/74 |
| 4,300,729 | 11/1981 | Oishi | 242/74.1 |

Primary Examiner—Edward J. McCarthy
Attorney, Agent, or Firm—Oblon, Fisher, Spivak, McClelland & Maier

[57] ABSTRACT

A hub for magnetic tape having a recess formed in the peripheral part of the hub and a magnetic-tape clamp to be fitted into the recess comprises an upper rib having an outer surface with the same curvature as that of the hub; legs formed at both ends of the upper rib; projections extending outward from the legs to be fitted into the side wall grooves of the recess; and lower ribs extending inward from the legs to terminate in the vicinity of a convex portion formed in the central part of the recess bottom.

4 Claims, 5 Drawing Figures

HUB FOR MAGNETIC TAPE

BACKGROUND OF THE INVENTION

1. Field of the Invention

The present invention relates to a hub of a magnetic tape cassette. More particularly, it relates to an improvement of a magnetic-tape clamp for securing a magnetic tape to a reel in magnetic tape cassette.

Various types of clamping means have been used for securing a magnetic tape or a leader tape to the reel of a magnetic tape cassette etc. The clamping of the magnetic tape requires that the clamping force should be sufficiently large, the outer periphery of the clamping member should have the same curvature as that of the hub of a reel and a step should not be formed between the ends of the clamping member and the reel.

FIGS. 1 and 2 show two types of magnetic-tape clamps which fairly satisfy the factors above described among the conventional type clamps (Japanese Utility Model Application No. 154953/1979). The clamp (2) shown in FIG. 1 or 2, made of plastic material having resiliency, is fitted into the recess of a hub (1) to clamp a magnetic tape or a leader tape (8) between the clamp (2) and the surface of the recess, thus the clamping of the magnetic tape is performed. The clamp (2) comprises an upper rib (3) having a circular-arc surface with the same curvature as that of the outer periphery of the hub (1), a pair of legs (4), (4) formed at both ends of the circular-arc and outer projections (5), (5) extending from the ends of the legs respectively. These outer projections (5), (5) are fitted into the grooves formed in the side walls of the hub (1) to clamp the magnetic tape. In order to increase the clamping force, a resilient lower rib (6) is utilized in the clamp shown in FIG. 1 and an inserting body (7) as a separate member is used in the clamp shown in FIG. 2. The conventional clamp has the disadvantage in that when the magnetic tape is forcibly pulled with a force greater than that given depending on the resiliencies of the legs (4), (4) and the lower rib (6), the magnetic tape is drawn out from the clamp (FIG. 1) or the using of the separate inserting body (7) causes an inconvenient fitting and has a tendency of easily dropping-out (FIG. 2).

SUMMARY OF THE INVENTION

It is an object of the present invention to provide a magnetic-tape clamp for attaining a greater clamping force comparing to the conventional magnetic-tape clamp.

The foregoing and the other objects of the present invention have been attained by providing a hub for magnetic tape comprising a recess formed in the peripheral part of the hub and a magnetic-tape clamp to be fitted into the recess which comprises an upper rib having an outer surface with the same curvature as that of the hub; legs formed at both ends of the upper rib; projections extending outward from the legs to be fitted into the side wall grooves of the recess; and lower ribs extending inward from the legs to terminate in the vicinity of a convex portion formed in the central part of the recess bottom.

BRIEF DESCRIPTION OF THE DRAWINGS

The same reference numerals designate the same or corresponding parts throughout several figures.

DETAILED DESCRIPTION OF PREFERRED EMBODIMENT

An embodiment of the present invention will be described with reference to drawings.

Figure 1:
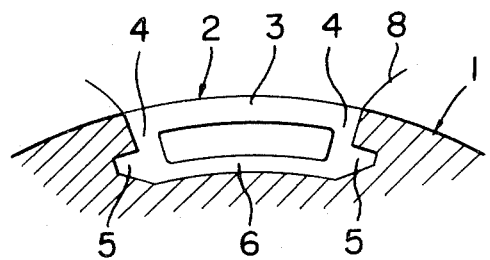
FIGS. 1 and 2 are partially sectional views of the conventional hubs with magnetic-tape clamp respectively.
Figure 2:
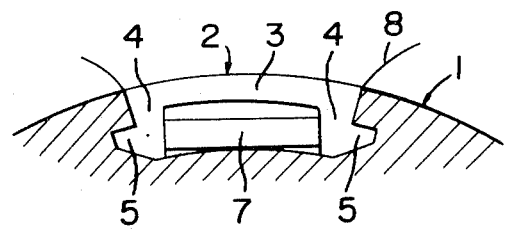
Figure 3:
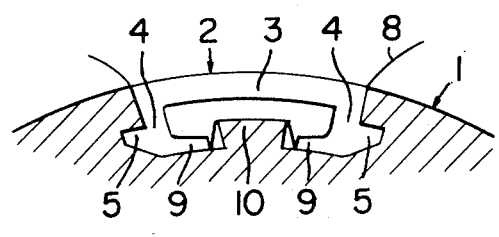
FIG. 3 is a partially sectioned front view of an embodiment of the hub with a magnetic-tape clamp according to the present invention.
Figure 4:
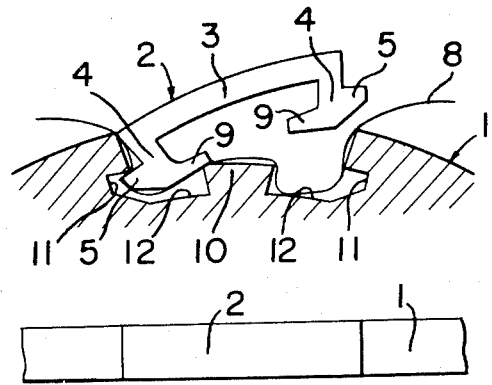
FIG. 4 is a partially sectioned front view of similar to FIG. 3 but showing a state when the clamp is inserted.
Figure 5:
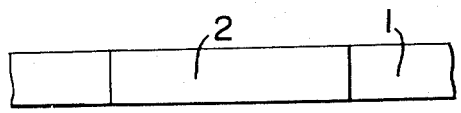
FIG. 5 is a plan view of FIG. 4.

FIGS. 3 and 4 show a magnetic-tape hub with a tape clamp according to an embodiment of the present invention. The magnetic-tape clamp (2) is made of plastic material having a sufficient rigidity and a capability of deformation with resiliency. The clamp (2) comprises an upper rib (3) with a circular-arc surface having the same curvature as that of the outer peripheral surface of a hub for holding a magnetic tape; legs (4), (4) extending downward from both ends of the upper rib and sawtooth shaped projections (5), (5) extending outward and horizontally from the leg ends respectively. The projections (5), (5) are formed so that they can be resiliently fitted into the recess of the hub (1) and can secure the engagement with it. Lower ribs (9), (9) are formed so as to extend inward and horizontally from the ends of the legs (4), (4) respectively.

The recess of the hub for magnetic tape is formed by side walls and the bottom wall which just correspond to the profile of the clamp (2). The grooves (11), (11) in the side walls hold the projections (5), (5) of the clamp respectively to secure the clamp. The lower surfaces of the legs (4), (4) and the lower ribs (9), (9) are held by the bottom wall of the recess. A convex portion in a table-like shape is provided in the central part of the bottom wall. As illustrated in FIG. 3, only small gap is left between the inner ends of the lower ribs (9), (9) and the convex portion (10). The dimension of the gap, as described below, is determined so as to be sufficiently small so that the clamping force is increased by the contact of the lower ribs (9), (9) with the convex portion (10) and sufficiently large so that the clamp (2) can be fitted into the recess.

When the hub of the present invention is used, the magnetic tape or leader tape (8) is placed on the recess of the magnetic-tape hub (1) and the clamp (2) is put on to be brought into the recess with a depressing force. The clamp falls along the side wall of the recess under the resilient deformation of the upper rib (3), the legs (4), (4) and the lower ribs (9), (9), thus the projections (5), (5) are fitted into the grooves (11), (11) and the lower ribs (9), (9) are brought to contact with the bottom wall (12) (12) to occupy both sides of the table-shaped convex portion (10). If a sufficient space is not left between the lower ribs (9), (9) and the table-shaped convex portion (10), the fitting of the projections (5), (5) into the grooves (11), (11) is impossible. Thus, the leader tape (8) is firmly clamped in the hub (1) (FIG. 3). If certain trouble occurs to pull the leader tape (8) with a great force when the magnetic tape wound around the hub (1) has been completely rewound, the tape (8) pushes the projections (5) (5) inward so that the legs (4) (4) are bent inward (i.e. toward each other). However, the bending of the legs (4), (4) is prevented by the contacting of the inner ends of the lower ribs (9), (9) to the both sides of the table-shaped convex portion (10) (FIG.

3). The stronger clamping force is applied to the magnetic tape (8) even though the pulling force to the tape (8) increases.

The position of the clamp is given by fitting the projections (5), (5) into the grooves (11), (11) so that no step is resulted between the clamp surface and the outer periphery of the hub (1) and a highly circular shape of the hub is assured. The shape of convex portion can be an inverse trapezoid.

As described above, the hub for magnetic tape of the present invention comprises a pair of lower ribs extending inward from the both ends of the two legs and have free ends, instead of the connected rib (6) or the inserting body (7) as is used in the conventional clamp, and the table-shaped convex portion formed in the central part of the recess bottom of the hub in such a shape that the convex portion is between the lower ribs. Accordingly, the clamping force to the magnetic tape increases because the pair of ribs are pushed on the table-shaped convex portion even though an excessive pulling force is applied to the magnetic tape.

I claim:

1. In a hub for securing a magnetic tape comprising a recess formed in the peripheral part of the hub, said recess including side wall grooves and a bottom, and a magnetic-tape clamp formed of a resilient material for fitting into the recess, an improvement which comprises an upper clamp rib formed of resilient material and having an outer surface with the same curvature as that of the hub; legs formed at both ends of the upper rib; projections extending outward from the legs by a first distance to be fitted into the side wall grooves of the recess; a convex portion formed in the central part of the recess bottom; and lower ribs extending inward from the legs to terminate in the vicinity of, and spaced from, said convex portion formed in the central part of the recess bottom by a second distance, said second distance being less than said first distance and being sufficiently large for said projections to be fitted into said side wall grooves.

2. A hub according to claim 1 wherein said lower ribs extend horizontally inward from both ends of the legs.

3. A hub according to claim 1 wherein said convex portion has a table-like shape.

4. A hub according to claim 3 wherein said convex portion has an inverse trapezoidal shape.

* * * * *